Figure 1:
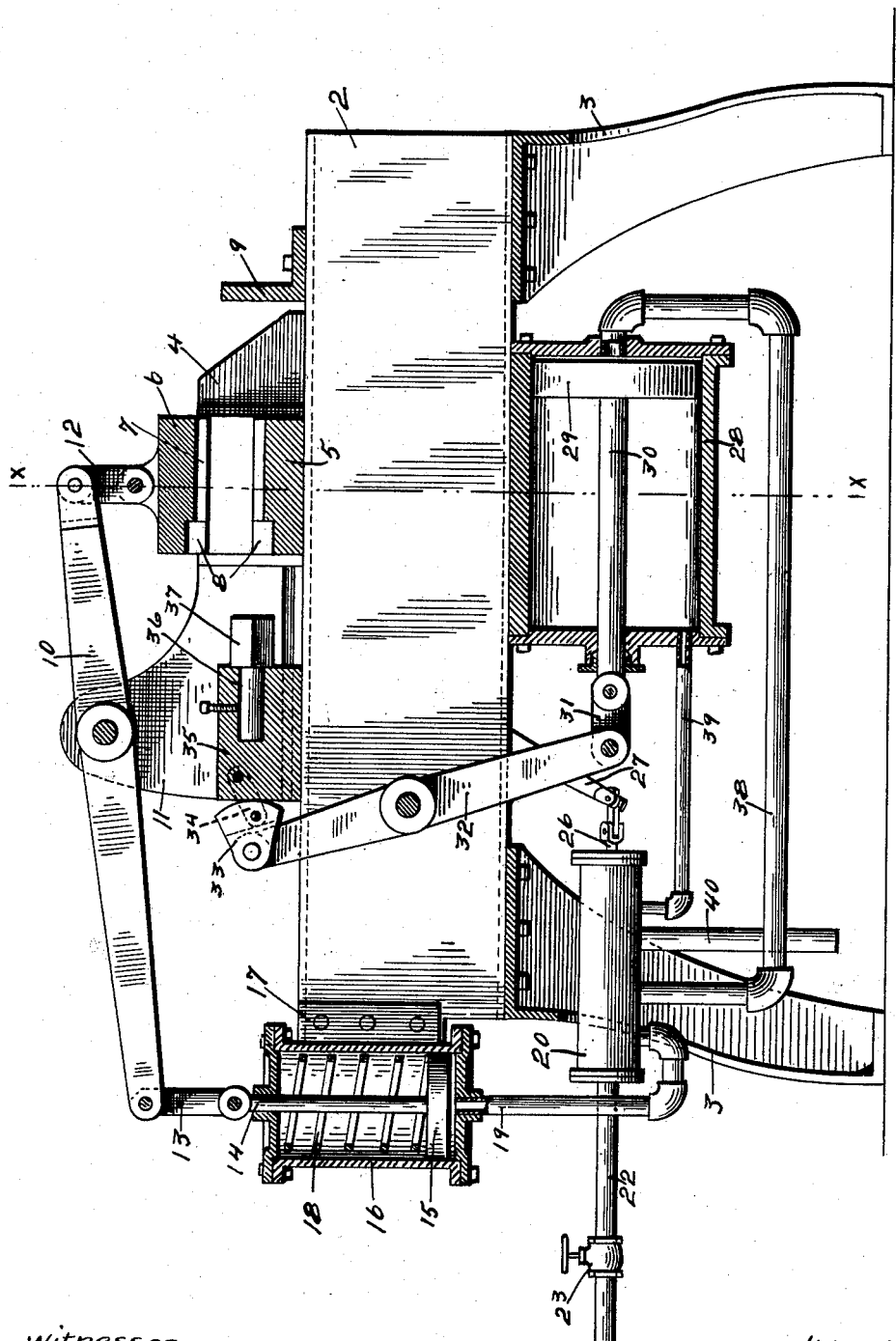

No. 757,409. PATENTED APR. 12, 1904.
H. O. OLSON.
BOLT HEADING MACHINE.
APPLICATION FILED FEB. 19, 1903.

NO MODEL. 2 SHEETS—SHEET 1.

Witnesses
Inventor
Hans O. Olson
By Paul H Paul
his attorneys

No. 757,409. PATENTED APR. 12, 1904.
H. O. OLSON.
BOLT HEADING MACHINE.
APPLICATION FILED FEB. 19, 1903.
NO MODEL. 2 SHEETS—SHEET 2.
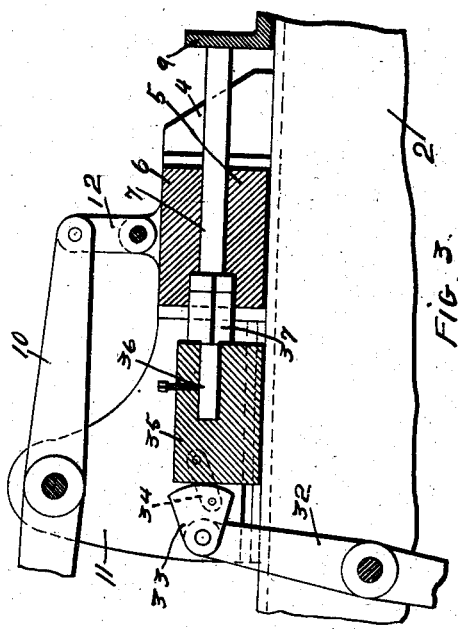
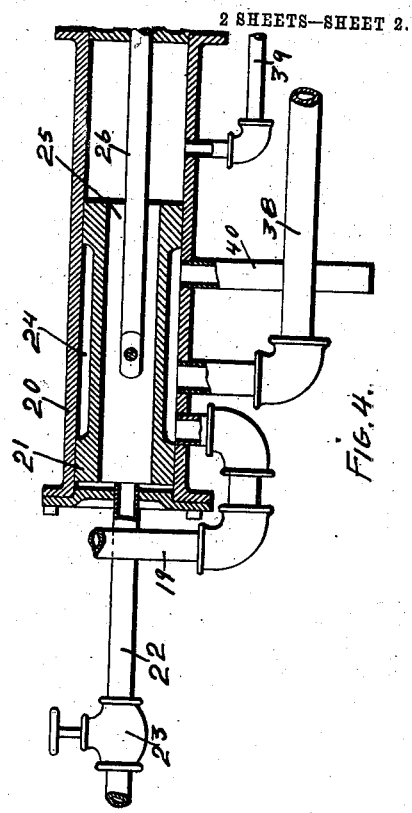
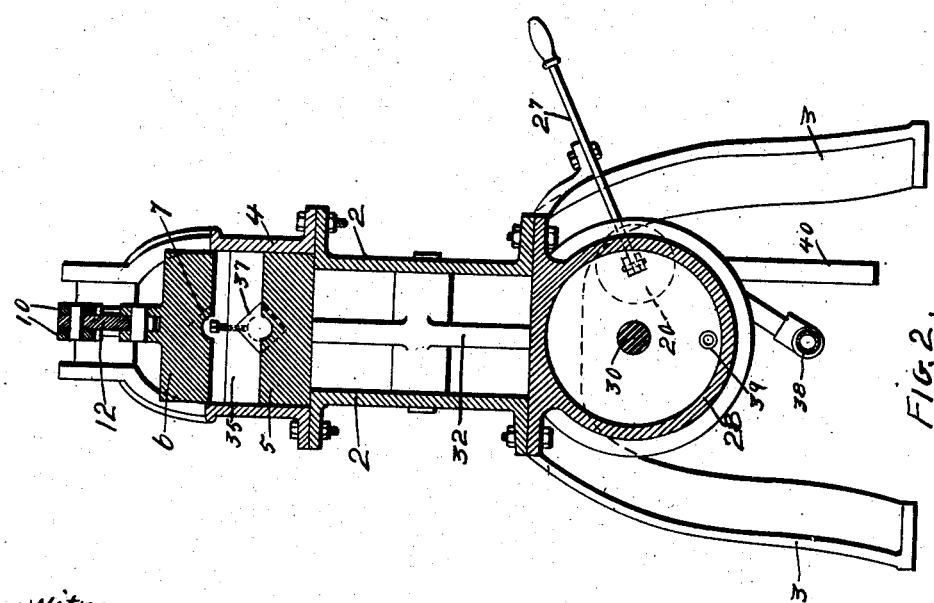
Witnesses
Inventor
Hans O. Olson
By his attorneys No. 757,409.

Patented April 12, 1904.

UNITED STATES PATENT OFFICE.

HANS OTTO OLSON, OF TWO HARBORS, MINNESOTA, ASSIGNOR OF ONE-HALF TO W. E. LAWRENCE AND H. H. McNAMARA, OF DULUTH, MINNESOTA.

BOLT-HEADING MACHINE.

SPECIFICATION forming part of Letters Patent No. 757,409, dated April 12, 1904.

Application filed February 19, 1903. Serial No. 144,057. (No model.)

*To all whom it may concern:*

Be it known that I, HANS OTTO OLSON, of Two Harbors, county of Lake, State of Minnesota, have invented certain new and useful Improvements in Bolt-Heading Machines, of which the following is a specification.

My invention relates to bolt-heading machines of the pneumatic type.

The object of the invention is to provide a machine which will produce a bolt-head of any desired size and shape and dispense with hand labor almost entirely and produce a superior article quickly and economically.

A further object is to provide a machine for heading a bar which will do away with the usual "upsetting" or "welding-on" process and eliminate entirely the usual hammering, swaging, and reheating operations.

A further object is to provide a machine in which there will be no loss of material from hammer-scale and the required depth of head and the exact dimensions can be readily obtained.

The invention consists generally in various constructions and combinations, all as hereinafter described, and particularly pointed out in the claims.

In the accompanying drawings, forming part of this specification, Figure 1 is a longitudinal vertical section of a bolt-heading machine embodying my invention. Fig. 2 is a vertical section on the line $x\,x$ of Fig. 1. Fig. 3 is a detail showing the position of the dies and the plunger in the act of forming the bolt-head. Fig. 4 is a longitudinal section of the slide-valve controlling the admission of fluid-pressure to the cylinders.

In the drawings, 2 represents a suitable base mounted upon legs 3 and consisting, preferably, of channel-bars placed web to web and spaced from one another and suitably secured, as by bolts, to the supporting-legs. Upon the bars 2 are secured fixed guides 4, and within the space between said guides is a fixed portion 5 of the die, the other portion, 6, being vertically movable between said guides. These dies have in their contiguous faces grooves 7 to receive the bar whereon the head is to be formed and recesses 8, within which the head is formed by the action of the plunger. An adjustable stop 9 is arranged on the bars 2, against which the end of the bar on which the head is to be formed bears during the operation of the machine. (See Fig. 3.)

10 is a lever pivoted on a standard or bracket 11 and pivotally connected by a link 12 with the movable portion 6 of the die. The opposite end of the lever 10 is connected by a link 13 with a piston-rod 14, whose piston 15 is movable within a vertically-arranged cylinder 16, secured, preferably, to the bars 2 at one end by any suitable means, as the brackets 17. A spring 18 is provided within the cylinder 16 and normally holds the piston 15 in its depressed position therein. A pipe 19 connects the lower end of the cylinder 16 with a valve-casing 20, wherein the slide-valve 21 is arranged. A pipe 22 leads into the end of the casing 20 and through which air under pressure or steam is admitted to the casing. A suitable valve 23 controls the flow of fluid-pressure through the pipe 22. The valve 21 is provided with an annular groove or channel 24, as usual in valves of this type, and also with a longitudinal opening 25, that permits the air or steam to flow therethrough and equalize the pressure at each end of the valve, and therefore balance it.

26 is a valve-rod connected to an operating-lever 27, by means of which the person in charge of the machine can control the flow of air or steam to the operating-cylinders.

28 is a cylinder secured, preferably, to the under side of the bars 2 and having a piston 29, provided with a rod 30, that is connected by a link 31 with a lever 32, that is fulcrumed between the bars 2 and is provided with a pivoted head-block 33, connected by a link 34 with a reciprocating plunger-block 35, that is slidable in guides on the top of the bars 2. This block 35 is provided with a socket 36 to receive the male die 37, which coöperates with the recesses in the female dies 5 and 6 to form the bolt-head. Pipes 38 and 39 connect the valve-casing 20 with the ends, respectively, of the cylinder 28, and between the said pipes the casing 20 is provided with an exhaust-pipe 40. There are three steps or functions in the operation of this machine. First, the working back and forth of the hand-lever operates the balanced valve to admit air to the operating-cylinders. The second step is a result of the first, causing the two halves of the female die to be brought together and closing them upon the bar on which the head is to be formed, and the third step is the movement of the plunger and its die into contact with the heated end of the bar to form the head.

The operation briefly of the machine is as follows: The heated bar having been placed in the female die by hand, the operator grasps the hand-lever and moves the slide-valve toward the right a sufficient distance to allow the fluid-pressure to flow from the pipe 22 through the pipe 19 to the cylinder 16. The piston 15 will be raised by said pressure against the tension of the spring 18, and the upper or movable half of the die will be depressed upon the lower fixed half and the bar resting thereon. Further movement of the slide-valve in the same direction will admit air through the pipe 38 to the cylinder 28 behind the piston 29. Movement of the piston 29 will oscillate the lever 32 and force the plunger-head and the die carried thereby toward the heated end of the bar and quickly form the head thereon, the number of reciprocations of said plunger being regulated, of course, by the movement of the operating-lever. As soon as the head has been formed the operator will move the valve to the position shown in Fig. 4, when both of the cylinders will exhaust into the pipe 40. The plunger-head will be withdrawn, and the piston 15 being relieved of the pressure thereon will be returned to its normally depressed position by the tension of the spring 18. The depression of the piston 15 will separate the sections of the female die and allow the removal of the completed bolt, when the operation as above described is repeated.

The bed or base of the machine may be made in one piece with a centrally-arranged slot therein, but is preferably constructed, as shown, of the channel-bars placed web to web. While I prefer to use air under pressure for operating the cylinder-pistons in this apparatus, it will be understood that other fluid-pressure may be substituted, if preferred.

I claim as my invention—

1. The combination, with a frame, of a female die thereon divided horizontally into a fixed and a vertically-movable member between which the bolt to be headed is placed, a lever horizontally pivoted at a point intermediate to its ends on said frame and pivotally connected at one end to and overhanging said vertically-movable member, a cylinder having its piston connected with the other end of said lever, a plunger horizontally slidable toward and from said die, a second lever vertically pivoted at a point intermediate to its ends on said frame and having its upper end connected with said plunger, a second cylinder arranged beneath said frame having its piston connected with the lower end of said second lever, a valve-casing and a sliding valve mounted therein, pipes connecting said valve-casing with said cylinders and with a motive fluid, and a single operating-lever arranged to move said valve and successively admit motive fluid to said cylinders, for the purpose specified.

2. A bolt-heading machine, comprising a frame composed of parallel channel-bars placed on edge and back to back with a space between them and suitable legs supporting the same, a fixed die-section resting upon the upper edges of said bars, a vertically-movable die-section, guides between which said movable die-section is raised and lowered, a lever horizontally pivoted at a point intermediate to its ends on said frame and connected at one end with said movable die-section, an upright cylinder having its piston connected with the other end of said lever, a plunger slidably arranged on said bars and movable toward and from said die-section, an upright lever pivoted at a point intermediate to its ends between said bars and connected at its upper end to said plunger, a horizontal cylinder supported beneath said bars and having its piston connected with the lower end of said upright lever, a valve-casing having pipe connections with said cylinders and with a motive fluid, and a valve arranged to control successively the admission of the motive fluid to said cylinders, substantially as described.

3. A bolt-heading machine, comprising parallel bars placed on edge with a space between them and suitable legs supporting the same, a female die mounted upon the upper edges of said bars and divided horizontally into a fixed and a movable section, guides between which said movable section is vertically slidable, a horizontally-arranged lever pivoted at a point intermediate to its ends on said bars above said die and having one end pivotally connected with said movable die-section, an upright cylinder having its piston connected with the other end of said lever, a plunger slidably arranged on the upper edges of said bars and movable toward and from said die, an upright lever pivoted at a point intermediate to its ends between said bars and provided at its upper end with a head having a rounded face adapted to bear on said plunger and pivotally connected therewith, a horizontal cylinder beneath said bars having its piston connected with the lower end of said upright lever, a valve-casing having pipe connections with said cylinders and with a source of motive fluid, and a valve arranged to control the admission of motive fluid to said cylinders successively.

4. The combination, with a frame, of a female die supported thereon and divided horizontally into a fixed and a movable section, guides between which said movable section is arranged to reciprocate vertically, a lever pivotally connected with said movable section, a sliding plunger movable toward and from said die, an upright lever centrally arranged with respect to the direction of movement of said plunger and pivotally connected thereto, cylinders connected with said levers, a valve-casing having pipe connections with said levers and a source of motive fluid, and a sliding balanced valve arranged to control the admission of fluid successively to said cylinders.

In witness whereof I have hereunto set my hand this 11th day of February, 1903.

HANS OTTO OLSON.

In presence of—
  JOHN DWAN,
  D. A. BURKE.